Patented Dec. 17, 1929

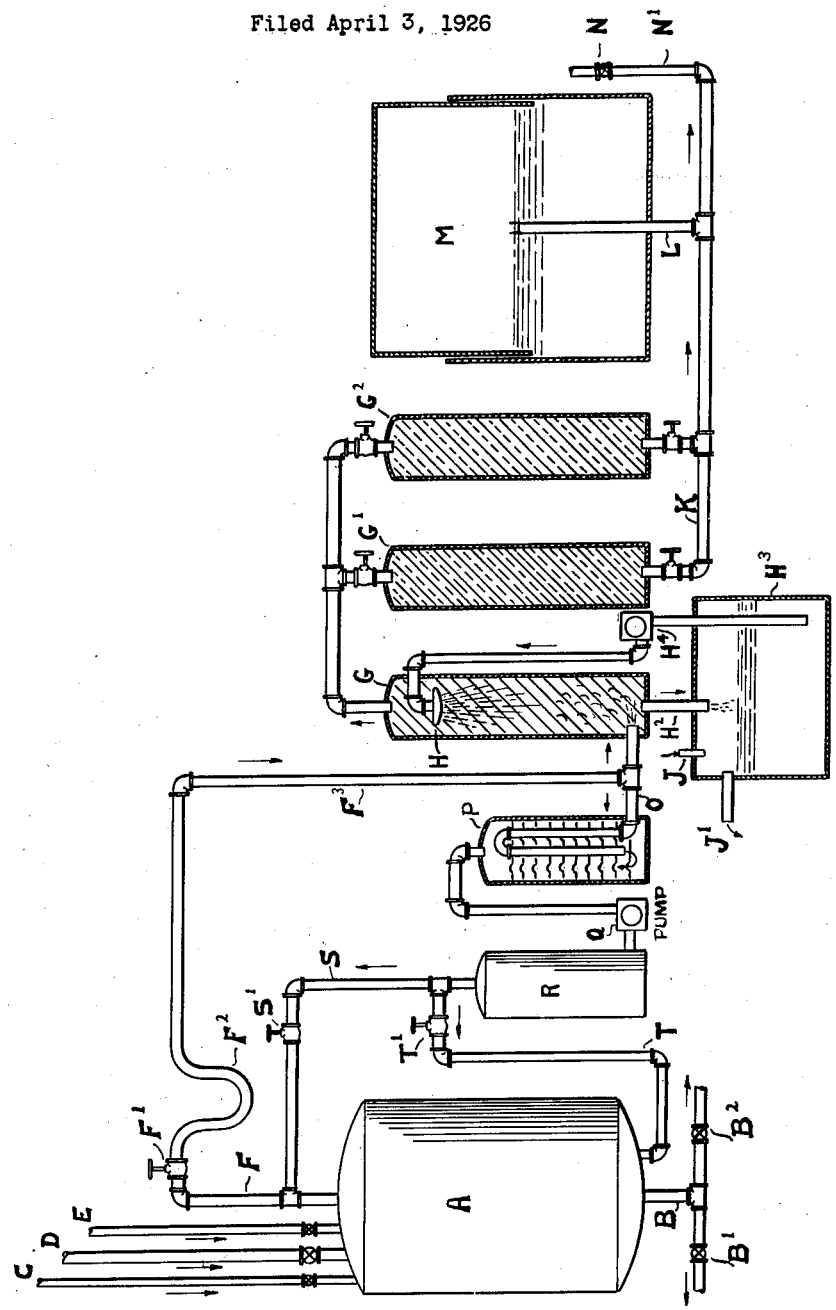

1,740,163

UNITED STATES PATENT OFFICE

WILLIAM J. EDMONDS, OF TERRE HAUTE, INDIANA, ASSIGNOR TO COMMERCIAL SOLVENTS CORPORATION, OF TERRE HAUTE, INDIANA, A CORPORATION OF MARYLAND

FERMENTATION APPARATUS

Application filed April 3, 1926. Serial No. 99,566.

My invention relates to an improved fermentation apparatus in which the gases evolved during fermentation may be recovered in pure form without contamination by air. My invention also relates to an apparatus in which means are provided for recovering the solvent vapors entrained in fermentation gases.

The fermentation of carbohydrates by butyl-acetonic bacilli is an industry that has developed on a large scale, and as a by-product of the solvents such as butyl alcohol and acetone that are so produced, there is produced an immense volume of "fermenter gas" which consists of a mixture of hydrogen and carbon dioxide. The recovery in pure form, uncontaminated by air, of these valuable fermentation gases is one of the principal objects of my present invention, though, as will later become apparent, my apparatus is suitable for the recovery of the carbon dioxide gas obtained in the ethyl alcohol fermentation, and for the recovery of other fermentation gases, such as are produced, for example, in the fermentation of cellulose.

Since my apparatus is of special usefulness in the butyl-acetonic fermentation process, I will describe it in detail as used in that industry.

The art of butyl-acetonic fermentation is well described in the literature and in a number of patents, notably U. S. Patents 1,315,585; 1,329,214; 1,385,888; 1,427,595; 1,538,516; etc. When carbohydrates are fermented by the butyl-acetonic fermentation there is obtained per pound of carbohydrate about five cubic feet of "fermenter gas" measured at ordinary temperatures and pressures. The solvents—i. e. butyl alcohol and acetone—remain in the fermented mash and are at the present time, recovered therefrom by distillation.

In the past, however, the "fermenter gas," which may slightly vary in composition but which consists of approximately 45% of hydrogen and 55% of carbon dioxide, by volume, has been simply discharged into the atmosphere and a great economic loss has resulted. The carbon dioxide and hydrogen may be separated by known processes and each gas has many possible industrial applications. There also exists the possibility of using the fermenter gas—per se—or after some carbon dioxide has been removed—for the high pressure catalytic synthesis of methanol, formaldehyde, and other organic compounds.

In the past, the industrial utilization of "fermenter gas" has not achieved practical accomplishment and one potent factor that has held back the art has been the fact that it has been deemed impossible to secure fermenter gas free from contamination with air. Fermenter gas containing free oxygen cannot be economically utilized, nor can hydrogen or carbon dioxide be obtained therefrom in pure form except by expensive refrigeration methods. The presence of oxygen and nitrogen renders carbon dioxide unfit for many uses and hydrogen containing oxygen cannot be employed in hydrogenation processes.

The fermentation of carbohydrate mashes in the great fermenting vessels used in the industry according to past practices has inevitably resulted in the contamination of fermenter gas with air. It is true that during active fermentation so much fermenter gas is generated that any air present in the vessels or pipe lines is swept out and pure fermenter gas will issue from the vats. However there is a large loss of valuable gas in this "sweeping out" process and it is this loss that my improved apparatus prevents. Under present procedure when a fermenting vessel is emptied of mash it is inevitable that air is introduced into the vessel, and my improved apparatus avoids this loss also.

I shall now describe my improved apparatus in detail by reference to the accompanying drawing.

A represents a fermentation vessel or vat, closed to the atmosphere and having a suitable mash exit port B at the bottom, through which the fermented mash can be sent to the stills through pipe $B^1$, and water or the like can be removed through pipe $B^2$. C, D, and E are entrance ports to the fermenting vessel, controlled by valves as indicated, and used for supplying the fermentation vessel with steam, mash, and inoculant respectively. F is a lead-off pipe through which the gases evolved in the fermentation vessel are passed through the gas exit valve $F^1$ and the water seal $F^2$ downward and into the solvent absorption system through pipe $F^3$.

In the drawing, the solvent absorption system is represented by three towers G, $G^1$, and $G^2$. In tower G the ascending gas meets with a downward stream of water from spray head H, this water trickling down the tower over a mass of inert packing material. The water passes out of the bottom of the tower through pipe $H^2$ into a sump $H^3$ which supplies the water circulating system through the pump $H^4$. As the scrubbing water becomes saturated with solvents it is drawn off through pipe $J^1$ and fresh water is added through pipe J.

The gas rising to the top of tower G passes through the lead-off line into either tower $G^1$ or tower $G^2$. These towers contain a solid solvent absorbent such as activated charcoal or silica gel. As is indicated in the drawing the gas from G may be sent downward through either tower $G^1$ or $G^2$, or the two towers may be used in tandem.

In practice one tower is used for absorbing the residual solvent vapors in the fermentation gas while the solvents previously absorbed in the other tower are being driven off by the application of heat, steam, or water, by ordinary means not shown on the drawing. If desired, a plurality of towers may be employed. The solvent-stripped gases from towers $G^1$ and $G^2$ are led off by the pipe header K and pass through pipe L into a gasometer M for storage. If the valve N on gas delivery pipe $N^1$ is open, the gases of course do not enter the gasometer, but travel directly out of the delivery pipe. If the valve N is closed the gases are stored in the gasometer and may be drawn off at any time by opening valve N.

A pipe, O, is connected to the pipe F which supplies the solvent absorption towers previously mentioned with gas. This pipe O offers a passage for gas from the main recovery system into a gas sterilizer P. As shown in cross-section on the drawing P consists of a closed vessel containing a sterilizing solution through which the gas from pipe O must pass.

To assist in thorough sterilization, this sterilizer may contain plates equipped with boiling caps, the two forming a structure analogous to the inside of a fractional distillation column, the purpose of the plates and caps being to assure complete contact of the gas with the sterilizing solution. Regardless of the exact internal structure of the sterilizer it should be remarked that its sole function is to destroy any bacteria or organisms which may be suspended in the fermenter gas. The passage of gas through the pipe O and sterilizer P is caused by the suction created by the pump compressor Q which in turn delivers the gas in compressed condition for storage in a gas storage tank R. This pump compressor is equipped with the usual check valve to prevent a flow of gas backward through it from the compressed gas storage tank R when the pump-compressor is not in operation.

Q and R may be equipped with an automatic pressure sustaining device by means of which the pump compressor is automatically started when the pressure in R drops below a predetermined figure, and automatically stopped when the pressure is built up to the required amount.

From the tank R, compressed fermentation gas may be supplied to the top of fermentation vessel A by pipe S and valve $S^1$, or to the bottom of said vessel by pipe T and valve $T^1$.

In the use of the apparatus as above described a unit cycle of operations commences when the vessel A is filled with fermentation gas. Mash is introduced through pipe D and inoculant through pipe E, or if desired, the mash may be inoculated with bacteria before it is placed in vessel A. At this time, valves $B^1$, $B^2$, $S^1$, and $T^1$ are shut. The gas exit valve $F^1$ is open and as the mash runs in the vessel it displaces the fermentation gas into the recovery system. Fermentation is allowed to proceed and the gas evolved passes out through valve $F^1$ in such a manner that the gas in A is maintained at a pressure above atmospheric—about three pounds.

The gas passing through pipe $F^3$ passes through the solvent absorption system—i. e. towers G and $G^1$ or $G^2$ as previously described and passes into header K and through pipe L into the gasometer M. The passage through the solvent absorption system causes a diminution in gas pressure so that if the initial pressure in the fermenting vessel is at three pounds, the pressure of the gas entering the gasometer is about one-half pound. As the solvent-free gas is required for use it is removed from the system through pipe $N^1$ and delivery valve N. The opening of this valve causes gas whch previously entered the gasometer M through pipe L to pass downward through pipe L into pipe $N^1$.

As previously described, the compressed gas storage tank is kept full of sterilized gas, preferably at about twenty pounds pressure. When fermentation is complete the fermented mash is drained out of vessel A by means of pipe B and valve $B^1$. At this time, gas exit valve $F^1$ is shut, and fermenter gas under pressure is introduced into vessel A by pipe S. This fermentation gas, displacing the mash in vessel A, prevents any air from leaking in and aids in the displacement. When the mash is drained out, the vessel A may, if desired, be sterilized by the application of steam, all of this occurring in an atmosphere of fermenter gas.

This completes the cycle of operations in the apparatus and when new mash is added the fermentation gas is displaced through valve F¹ as before.

From the above description it is obvious that by the use of my apparatus it is possible to conduct the butyl-acetonic fermentation of carbohydrates in an improved manner. In addition to producing the usual amount of solvents by the fermentation of a carbohydrate mash, it is possible to obtain the valuable fermentation gas in pure form uncontaminated by air and, at the same time, to recover the vapors of the solvents in the fermentation gases.

While I have completely described what I consider the most efficient and complete form of my apparatus it is obvious that many minor changes might be introduced without departing from the spirit and scope of my invention. For example the water seal F² might be omitted, the gases going directly from the fermentation vessel to the solvent absorption system. It is also obvious that a greater or lesser number of solvent absorption towers might be employed, and also that all of the towers might employ water scrubbing devices, or all might employ solid absorbents for the solvents. Likewise heavy oils or other reagents might replace water-scrubbing or solid absorbent methods.

In the same manner the gases might be led from the fermentation vessel A directly to the delivery pipe N¹ without interposing a gasometer, though this device is required if a steady supply of gas is desired.

While in the form of apparatus shown the gas passes through the solvent recovery system into the gasometer by means of the natural head pressure developed in the fermentation vessel and controlled by valve F¹, if desired a circulating pump might be introduced into the system and the gases thus caused to flow through the system at a higher pressure.

While in the form of apparatus shown, the supply of gas for sterilization, compression, and return to the vessel A is drawn from pipe F³ through pipe O, it is obvious that this supply of the gas might be obtained from the gasometer or from some other point in the system.

Although the recovery of the solvent vapors is required if practical economical operation is expected, it would of course be possible to dispense with the solvent recovery system or to recover the portion of the solvents that would dissolve in the water in the gasometer M in such a case.

While the fermenter gas to be returned to the vessel A should be sterilized to make sure no undesirable bacteria, developed in one fermentation are returned to the next, it is, of course, possible to dispense with this feature, also. Further, the sterilizer, instead of containing a sterilizing solution, might consist of an apparatus in which the gases are sterilized by contact with ultra-violet rays or contact with heat.

While in the drawing only one unit piece of apparatus is shown, actually a plurality of fermentation vessels are employed.

In a copending application U. S. Serial No. 99,565, filed April 3, 1926, applicant has claimed specifically the apparatus herein described above.

Now having described my invention I claim the following:—

1. In a fermentation apparatus, the combination of a fermentation vessel hermetically closed to the atmosphere and provided with a valved mash outlet, a valved fermentation gas outlet, a valved fermentation gas inlet, a solvent absorption system connected to the gas outlet, the improvement which comprises a sterilizer connected to the gas inlet and means for feeding a fraction of the produced fermentation gas through the sterilizer and the gas inlet into the fermentation vessel while the mash outlet is open, to displace the fermented mash in the said vessel.

2. In a fermentation apparatus, the combination of a fermentation vessel hermetically closed to the atmosphere and provided with a valved mash outlet, a valved fermentation gas outlet, a valved fermentation gas inlet, a solvent absorption system connected to the gas outlet, the improvement which comprises a sterilizer connected to the gas inlet and means for feeding a fraction of the produced fermentation gas through the sterilizer and the gas inlet into the bottom of the fermentation vessel while the gas outlet is open.

In testimony whereof I affix my signature.

WILLIAM J. EDMONDS.